Feb. 10, 1953   E. M. SPLAINE   2,627,783
OPHTHALMIC MOUNTING
Filed Nov. 21, 1947
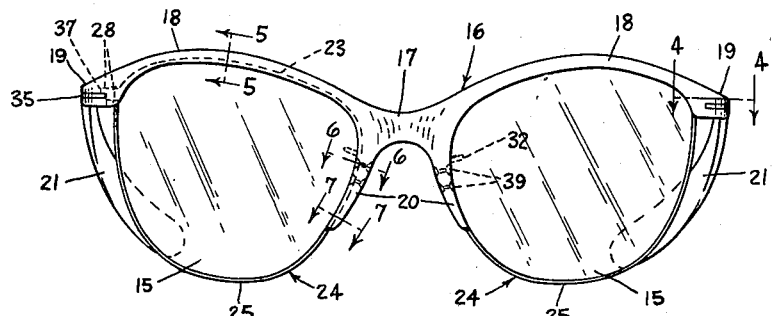
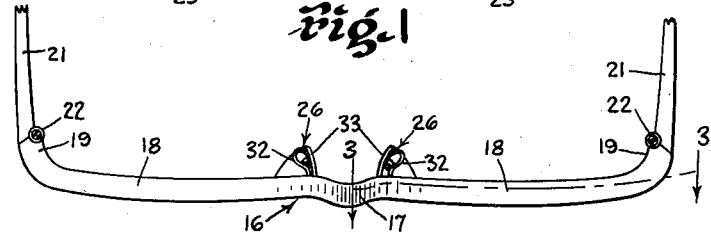
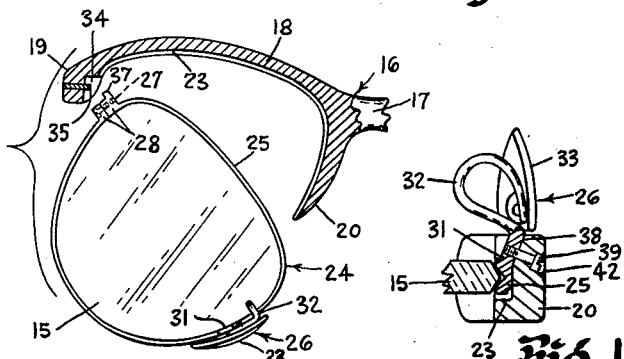
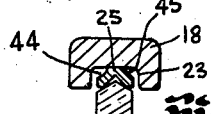
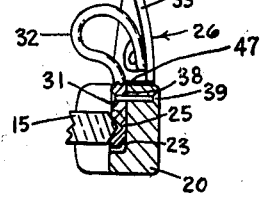
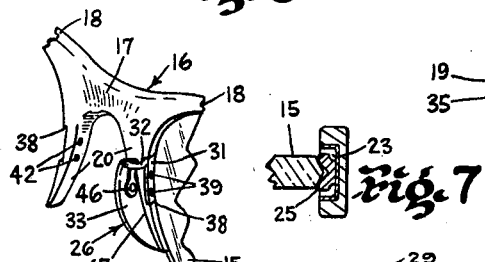
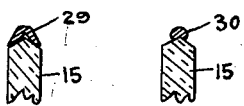
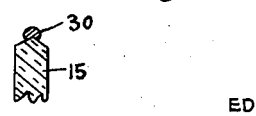
INVENTOR.
EDWARD M. SPLAINE
BY
Louis L. Gagnon
ATTORNEY Patented Feb. 10, 1953

2,627,783

UNITED STATES PATENT OFFICE 2,627,783

OPHTHALMIC MOUNTING

Edward M. Splaine, Southbridge, Mass., assignor to American Optical Company, Southbridge, Mass., a voluntary association of Massachusetts Application November 21, 1947, Serial No. 787,309

6 Claims. (Cl. 88—41)

This invention relates to ophthalmic mountings, and particularly to an improved supporting structure for the lenses of such mountings.

An important object of the invention is to provide an ophthalmic mounting with a lens supporting structure of a combined metallic and non-metallic type wherein the metal parts act in a plural capacity, to engage the entire periphery of the lenses, thus forming a protective shock-absorbing buffer around the lenses, to reinforce the non-metallic parts by strategic engagement therewith and thereby maintaining the non-metallic parts in their original shapes during the changes in atmospheric conditions to which they may be subjected, and also to carry the nose rests or pads common to this type of structure, thus eliminating a possible point of strain from the non-metallic parts.

Another object of the invention is to provide an ophthalmic mounting with a lens supporting structure of a combined metallic and non-metallic type wherein the non-metallic parts are arranged so that the major portions thereof are out of the useful field of vision when the mounting is in position of use on the face, while the metal parts are relatively inconspicuous, being scientifically shaped so as to be negligibly visible when properly assembled in the structure.

Still another object is to provide an ophthalmic mounting with a lens supporting structure whereby the lens may be inserted in the structure and removably held therein without the necessity of drilling the lens for insertion of such items as screws, rivets or the like, thus eliminating the drilling operation and consequent possible breakage due to the lens being weakened at the points of drilling.

Another object of the invention is the provision in an ophthalmic mounting of metal lens supporting members shaped in conformity with and located over the periphery of the lenses in such a manner that the lenses can be easily and simply assembled in the members to form detachable and interchangeable units, and the units inserted in a non-metallic partial or semi-frame structure with a minmum of stress being incurred by the non-metallic parts.

It is a further object of this invention to provide an ophthalmic mounting with a lens supporting structure, the lenses each being provided with a metal protective rim around the entire periphery thereof to form detachable and interchangeable units, and the units being adapted to be easily and quickly mounted in a non-metallic partial or semi-frame structure by simple and efficient means without involving the use of additional fastening or retaining devices or fixatives to maintain the lens units in desired and proper relation to the non-metallic frame.

Another object is the provision of a lens supporting structure wherein the lens is provided with a protective rim around the entire periphery thereof to form an easily detachable and interchangeable unit adapted to be mounted in and carried by a metal structure.

Another object is the provision of an ophthalmic mounting with a lens supporting structure of a non-metallic type having channels formed therein for reception of a portion of the contour edges of the lenses, the channels having metallic liners therein adapted to retain the supporting structure in its initial shape with the edges of the lenses being adapted to unrestrainedly reside within the inner confines of the liners.

Another object is the provision of an ophthalmic mounting having a lens supporting structure of the half or semi-frame type and which may be made of a light metallic or a non-metallic material, the lenses to be mounted in the structure and held therein by a latch type connection to provide easy removal and insertion of the lenses in the structure.

Another object is the provision of an ophthalmic mounting having a lens supporting structure of a combined metallic and non-metallic type, the non-metallic parts being readily adapted to various shapes, colors, and styles, with the metallic parts being strategically located for reinforcing and strengthening the non-metallic parts.

Further objects of the invention are to provide, in a manner as hereinafter set forth, an ophthalmic mounting which is simple in its construction and arrangement, strong, durable, thoroughly efficient in its use, readily assembled, and comparatively economical to manufacture.

Other objects and advantages of the invention will become apparent from the following description taken in connection with the accompanying drawing, in which:

Figure 1 is a front elevation of an ophthalmic mounting embodying the invention;

Figure 2 is a plan view of the mounting illustrated in Figure 1;

Figure 3 is a fragmentary front elevation in section taken on line 3—3 of Figure 2 showing a means for mounting the lenses in the supporting structure or frame disclosed in Figures 1 and 2;

Figure 4 is an enlarged sectional view taken on line 4—4 of Figure 1 and showing details of the means for connecting the lenses to the supporting structure at a point approximating their temporal regions;

Figure 5 is an enlarged sectional view taken on line 5—5 of Figure 1 showing the method of mounting the reinforcing rim over the periphery of the lens and within the channel of the supporting structure along the upper edge of the lens;

Figure 6 is an enlarged sectional view taken on line 6—6 of Figure 1 showing the means for attaching the nose pads to the reinforcing rims and subsequently to the supporting structure;

Figure 7 is an enlarged sectional view taken on line 7—7 of Figure 1 showing the method of mounting the reinforcing rim over the periphery of the lens and within a liner located in the channel formed in the supporting structure;

Figure 8 is a fragmentary enlarged perspective view of the nasal portions of the invention;

Figures 9 and 10 are enlarged sectional views showing modifications in the shapes of rims located on the periphery of the lens;

Figure 11 is an enlarged sectional view similar to Figure 6, being a modification thereof; and Figure 12 is an enlarged sectional view illustrating the preferred latch type means for connecting the lens rims to the supporting structure at their temporal regions.

Referring more particularly to the drawing wherein like characters of reference designate like parts throughout the several views, the device embodying the invention, as illustrated in Figure 1, comprises broadly a pair of lenses 15 carried by a supporting structure or frame 16. The supporting structure 16 consists of a main bridge member 17 having integral transverse lens supporting arms 18 shaped substantially to follow the adjacent upper contour edge portions of the lenses 15 and having temple supporting end portions 19 extending slightly beyond the edge of the lenses at the temporal regions thereof. The main bridge member 17 also has depending portions or arms 20 shaped substantially to follow the adjacent nasal contour edge portions of the lenses 15.

The temple supporting end portions 19 have suitable temples or sides 21 pivotally attached thereto as at 22, the portions 19 extending outwardly and rearwardly of the temporal ends of the transverse lens supporting arms 18 at a location above the line of straight ahead vision through the lenses and substantially out of the useful field of side vision when the mounting is in position of use, and the temples 21 being located adjacent this position.

The complete supporting structure 16 including the bridge member 17, transverse arms 18, depending arms 20 and temples 21, but excluding the temple pivotal connections 22, are preferably formed of non-metallic material such as zylonite, Celluloid, Bakelite or other artificial resinous material. It is to be understood that the said parts may be formed of any of the known plastic materials or any light weight metallic material such as aluminum or the like. The said parts, however, are preferably formed of materials having the characteristics of artificial resins which possess a relatively non-inflammable, acid-resisting nature, and which tend to be less subject to deformation from their original shapes due to changes in atmospheric or other conditions to which they may be subjected. Such materials are also exceedingly light in weight and are readily moldable or otherwise workable, and the parts composed thereof may be made to any desired color or colors.

Nevertheless, it being common knowledge that known non-metallic materials of this type are generally of a semi-pliable or flexible nature and are subject to deformation or distortion, in many instances it is necessary to provide a suitable means for strengthening or reinforcing parts made of these materials, particularly in ophthalmic mountings of the type disclosed by these specifications and when their cross sectional dimensions are reduced to a minimum. Therefore, there is formed in the transverse and depending lens supporting arms 18 and 20 a continuous inner channel 23 for locating the adjacent contour edges of the lenses 15 and in which such reinforcing means may be placed.

The lenses 15 each comprise an element of a detachable assembled lens unit 24 and as shown in Figure 3 each unit 24 is composed, besides the lens 15, of a metal rim 25 having an inner continuous groove and nose pad assembly 26. The edge of the lenses 15 are preferably provided with a V-shaped bevel around their entire periphery and are each thus adapted to fit within the inner V-grooved surfaces of the rims 25. Each rim is mounted completely around the lens with the ends being joined near the temporal region of the lens by means such as a screw 27 which is adapted to extend through concentric openings in small lugs 28 secured adjacent the abutting ends of the rim 25, with the opening in the upper lug being threaded to receive the threaded portion of the screw 27, the screw 27 when tightened being adapted to close the rim 25 snugly about the periphery of the lens 15. As is clearly indicated in the sectional views, particularly Figures 5 and 7, the rim 25 is scientifically shaped in such a manner that when the rim 25 is located in position on a lens 15 and secured in an ophthalmic mounting of the type described herein, the rim 25 will present a very small reflecting surface such as will cause it to be negligibly visible throughout the lower exposed portion thereof. This is accomplished by forming the rim 25 with a scientifically shaped outer surface, preferably having spaced concaved bevels 44 and 45 with a narrow flat strip therebetween. Other modifications, however, are shown in Figures 9 and 10, a rim 29 with flat bevelled side surfaces being disclosed by Figure 9 and a rim 30 with a rounded surface illustrated in Figure 10.

It is also to be understood that although the lenses throughout the contour edges thereof engaged by the rims 25 are preferably bevelled and the rims 25 are provided with a V-shaped groove to receive said bevel, the said contour edges, however, may be formed to any particular shape desired with the grooves in the rims 25 similarly shaped to interfit therewith.

The nose pad assemblies 26 are secured in integral relation with the rims 25 and as such are considered part of the units 24. Each nose pad assembly consists of an enlarged attachment portion 31 secured throughout its forward side edge to the adjacent rear side of the rim 25 and to which is fixedly secured the forward end of a rearwardly extending nose pad support or guard arm 32, said arm swivelly carrying a nose pad 33 as shown at 46. The swivel is formed by providing the end of the guard arm with a rectangular shaped opening and by providing the rear of the pad with a rectangular pin of slightly smaller cross sectional shape. After the pin is extended through the opening in the end of the guard arm its exposed end is provided with an enlarged head portion to loosely retain the parts in assembled relation.

Thus, each set of lenses 15, rims 25 and nose pad assemblies 26 constitutes a single easily detachable and interchangeable lens unit 24 adapted to be located within the continuous inner channel 23 of the transverse arms 18 and depending portions 20 of the main bridge member 17 of the supporting structure or frame 16. There are various ways of mounting the lens units 24 in the frame 16. However, one method is clearly disclosed in Figures 3, 4 and 5 wherein a recess 34 is formed midway of the front and rear surfaces of each of the temple supporting end portions 19 and communicating with the temporal end of the channel 23, and a horizontal kerf is also provided midway of the upper and lower surfaces of the portions 19 and is adapted to receive a metal lip fixedly retained in place by means of pins or rivets 36 of plastic or metal and having a portion extending into the recess 34 to form a shelf 35.

An outwardly extending projection 37, as shown in Fig. 3, is formed on the upper lug 28 of the rim 25 and in assembling the lens unit 24 to the supporting structure 16 the projection 37 is adapted to be inserted into the recess 34 in the temple supporting end portions 19 of the structure, with the projection 37 coming to rest upon the shelf 35 within the inner channel 23, thus forming a concealed easily detachable connection.

In the nasal regions of the depending lens supporting arms 20 of the bridge member 17, as shown best in Figures 3, 6 and 8 there is provided means functioning cooperatively with the shelf 35 and projection 37 for retaining the lens units 24 in proper assembled relation with the supporting structure 16. On the nasal side the wall rearwardly of the channel 23 is provided with a notch 38 for reception of the attachment portion 31 of the rim 25. The portion 31 is adapted to snugly fit within the notch 38 and to be retained therein by means of screws or pins 39 which are adapted to be inserted through concentric openings 42 formed in the depending portions or arms 20 and in the attachment portion 31. When screws are used as the attachment means the openings in the portion 31 are threaded to receive the threaded ends of the screws.

Thus, in assembling the lens in an ophthalmic mounting of this type, the assembler merely makes a choice of lenses 15, inserts the lenses in the rims 25, thus completing a lens unit 24, and then places the lens units in the supporting structure 16, first inserting the rim projection 37 into the recess 34 and into engagement with the upper surface of the shelf 35, then continuing to insert the upper contour edge of the lens units 24 into the inner continuous channel 23 of the arms 18 and depending portions 20, and in the same manner locating the nasal rim attachment portion 31 in notch 38. To complete the operation the retaining screws or pins 39 are then inserted. To merely insert a lens of a shape and size similar to a lens already located in the mounting, however, it is merely necessary to disengage the screw 27 in the temporal region of the lens rim 25, thus permitting the lower portion of the rim to be moved downwardly out of engagement with the edge of the lens, whereby the lens may be easily removed and replaced.

It is particularly pointed out as shown in Fig. 5, that the channels 23 in the arms 18 are of a width considerably greater than the width of the metallic rims 25. This is to provide clearance for the different forwardly curved shapes which the upper portions of the rims assume when lenses of different powers and having different base curves are placed in said rims, particularly when lenses of the contour shape shown in Fig. 3 are used.

The nose pads 23, as shown in Figures 6 and 8, differ from the conventional pads in that they each have a relatively straight forward edge 47 shaped to lie in adjacent substantially parallel spaced relation with the rear surfaces of the depending portions 20 and yet enables the adjustment thereof to different positions with respect to each other and to said rear surfaces by bending the arms 32. The pads are preferably formed of metal having a covering of non-metallic plastic material thereon. The pins by which they are secured to the perforated ends of the guard arms are secured to the rear surfaces of the metal inserts and extend through the outer non-metallic coverings.

In Fig. 12 there is shown a modification which might be considered a preferred construction of the invention wherein the projection 37 is provided with a downwardly extending curved end portion 40 on the underside thereof. The portion 40 is shaped to fit within a curved depression formed in the upper surface of the shelf 35, thus forming a simple ball-and-socket connection. In this instance the lower lug 28 has an outwardly projecting end 41 adapted to fit beneath the shelf 35. The assembling of the parts is brought about by first loosening the screw 27 an amount sufficient to extend the projection 37 inwardly of the recess 34 and to position the portion 40 in the curved depression in the upper surface of the shelf 35 and with the projecting end 41 lying below said shelf 35. The screw 27 is then tightened to draw the end 41 up into intimate relation with the under surface of the shelf. This locks the downwardly extending portion 40 in the curved depression and prevents the shelf 35 from being pulled outwardly from between the outwardly projecting portions 37 and 41.

The lenses may be interchanged without removing the metal rim 25 from the non-metallic upper part of the mounting by merely removing the screw 27 as heretofore described.

In Fig. 11 there is shown a further slight modification of the invention wherein the attachment plates 31 are angled so as to converge inwardly toward the nose whereby the connecting screws 39 will extend inwardly of the depending portions 20 at an angle. This is to permit greater ease in gaining access to the heads of the screws with a screw driver when positioning the units 24 in or when removing said units from the upper part of the mounting.

It can now be clearly understood that interchanging lenses in ophthalmic mountings of the herein described type is a very simple matter; also that assembled structures of this type by reason of the multi-purpose metal rims and non-metallic frames are stronger and more durable than generally known products due principally to the fact that the metal rims are assembled to the non-metallic frame in such a manner that the metal parts tend to reinforce the non-metallic parts and retain them in their original shapes.

In addition to this it can also be seen that in such a construction as herein shown and described the majority of the parts of the mounting are completely out of the useful field of vision, and the remaining parts most likely to be within the visual range are of such shape and design as to be practically invisible to the wearer as well as of negligible visibility to an observer.

However, it is to be understood that several changes or modifications may be made and that although the construction herein described as having a bridge member 17 formed to a given size and having transverse arms 18 and depending portions 20 formed integral therewith, the invention, as far as the combined metallic and non-metallic portions which are shaped to follow substantially the upper contour shape of the lenses are concerned, might be used with different types of bridge members, and it is also to be understood that the nose pads 26 instead of being formed integral with the rims 25 of the lens units 24 might be constructed in various manners integral with the bridge member. The rims 25 although described herein as being formed of metal may be formed of plastic or of any other suitable material.

It will be apparent that many changes may be made in the details of construction and arrangement of parts shown and described without departing from the spirit of the invention as expressed in the accompanying claims. Therefore, it is to be understood that all matter set forth or shown in the accompanying drawings is to be interperted as illustrative and not in a limiting sense.

I claim:

1. A lens supporting structure for the lenses of an ophthalmic mounting, said structure comprising an integral support having a central bridge of plastic material with integrally formed arms of said plastic material extending outwardly therefrom on opposed sides to follow the top edges of said lenses and terminating in temple connection supporting ends, said arms being longitudinally grooved on their underside from adjacent the bridge and each having an enlarged recessed portion inwardly of the temple supporting ends thereof and communicating with said grooved portion thereof, a slotted portion in said ends communicating with said recessed portion and a temple hinge plate member secured in said slotted portion, said hinge plate member having a portion protruding into the recess, and a pair of relatively thin rim members to encircle the peripheral edge of said lenses, said rim members being divided adjacent the temporal sides thereof to permit insertion and removal of the lenses, and with the opposed ends of said rim member adjacent said division having adjacent lug portions extending outwardly therefrom, and means for joining said lugs to maintain said ends of the rim member inseparable, the top portion of said rim members being seatable in the grooved portion of said arms, with the upper one of said lugs having a projection portion to rest on the protruding portion of the temple hinge plate member, and connection means for securing the nasal side of said rim members with the integral support adjacent the bridge.

2. A lens supporting structure for the lenses of an ophthalmic mounting, said structure comprising a central bridge of plastic material having integrally formed arms of said plastic material extending outwardly therefrom on opposed sides to follow the top edges of said lenses and terminating in temple connection supporting ends, said arms being longitudinally grooved on their underside from adjacent the bridge and each having a recessed portion in the temple supporting ends thereof communicating with said grooved portion thereof, and a plate-like member carried by said temple supporting ends and extending into the recessed portion thereof, said portion thereof extending into the recess having a depression in the upper surface thereof, a pair of relatively thin rim members to encircle the peripheral edge of said lenses, said rim members being divided adjacent the temporal sides thereof to permit insertion and removal of the lenses, and with the opposed ends of said rim member adjacent said division having lug portions extending outwardly therefrom, and means for joining said lugs to maintain said ends of the rim member inseparable, the top portion of said rim members being seatable in the grooved portion of said arms, with the upper one of said lugs having a portion to rest on the plate-like member extending into said recessed portion and having a protuberance on its undersurface to fit within said depression in the upper surface of said plate-like member, and connection means for securing the nasal side of said rim members with the bridge.

3. A lens supporting structure for the lenses of an ophthalmic mounting, said structure comprising a central bridge, a pair of outwardly extending arms on opposed sides thereof to follow the top edge of said lenses and terminating in temple supporting end portions, said arms being longitudinally grooved on their underside from adjacent the bridge and each having an enlarged recess adjacent said supporting end and communicating with the grooved portion thereof, and a pair of relatively thin rims to encircle the peripheral edge of said lenses, said rims being divided on their temporal side and having outwardly disposed lug portions adjacent the opposed ends of said division, said lugs being disposed within said enlarged recess of the arms, and being perforated to permit connection means to be extendable therethrough for maintaining said divided ends in joined relation, the top portion of said rims being held within the grooved portion of said outwardly extending arms by connection of the nasal side of the rims and connection of the upper of said lugs with the respective adjacent portions of the supporting structure, and said lower lug being freely separable from said upper lug by withdrawal of said connection means to permit the insertion and removal of a lens from a respective rim without disconnection of said rim from the supporting structure.

4. A lens supporting structure for the lenses of an ophthalmic mounting, said structure comprising a central bridge, a pair of outwardly extending arms on opposed sides thereof to follow the top edge of said lenses and terminating in temple supporting end portions, said arms being longitudinally grooved on their underside from adjacent the bridge and each having an enlarged recess adjacent said supporting end and communicating with the grooved portion thereof, and a temple hinge plate secured to said supporting end of the arms and extending to said enlarged recess therein, a pair of relatively thin rims to encircle the peripheral edge of said lenses, said rims being divided on their temporal side and having outwardly disposed lug portions adjacent the opposed ends of said division and within said enlarged recess of the arms, said lugs being perforated and having connection means extendable therethrough for maintaining said divided ends in joined relation, and the top portion of said rims being held within the grooved portion of said outwardly extending arms by connection of the nasal side of the rims with the supporting structure adjacent the bridge and by connection of the upper lug with the temple hinge plate, and said lower lug being freely separable from said upper lug by withdrawal of said connection means to permit the insertion and removal of a lens from a respective rim without disconnection of the rim from the supporting structure.

5. A lens supporting structure for the lenses of an ophthalmic mounting, said structure comprising a central bridge, a pair of outwardly extending arms on opposed sides thereof to follow the top edge of said lenses and terminating in temple supporting end portions, said arms being longitudinally grooved on their underside from adjacent the bridge and each having an enlarged recess adjacent said supporting end and communicating with the grooved portion thereof, and a temple hinge plate secured to said supporting end of the arms with an end thereof extending into said enlarged recess, a pair of relatively thin rims to encircle the peripheral edge of said lenses, said rims being divided on their temporal side and having outwardly disposed perforated lug portions adjacent the opposed ends of said division and pin-like means extendable through said perforations for maintaining said divided ends in joined relation, and the top portion of said rims being held within the grooved portion of said outwardly extending arms by means of attachment portions carried on the nasal side of the rims and adapted for connection with the supporting structure adjacent the bridge and by means of a projection formed on the upper lug which is adapted to rest on said end of the temple hinge plate extending into the enlarged recess, and said lower lug being freely separable from said upper lug by withdrawal of said pin-like securing means to permit the insertion and removal of a lens from a respective rim without disconnection of said rim from the supporting structure.

6. A lens supporting structure for the lenses of an ophthalmic mounting, said structure comprising a central bridge, a pair of outwardly extending arms on opposed sides thereof to follow the top edge of said lenses and terminating in temple supporting end portions, said arms being longitudinally grooved on their underside from adjacent the bridge and each having an enlarged recess adjacent said supporting end and communicating with the grooved portion thereof, and a temple hinge plate secured to said supporting end of the arms with an end thereof extending into said enlarged recess, a pair of relatively thin rims shaped to encircle the peripheral edge of said lenses and having their top portion seated in said longitudinal groove of the outwardly extending arms, said rims being divided on their temporal side and having outwardly disposed perforated lug portions adjacent the opposed ends of said division and disposed within said enlarged recess, and pin-like means extendable through said perforations for maintaining said divided ends in joined relation, an attachment plate-like portion integrally formed on the nasal side of the rims and connected by pin-like means to the supporting structure adjacent the bridge, said attachment plate-like portion having a rearwardly extending arm secured thereto and a nose pad pivotally mounted on said rearwardly extending arm, and a projection formed on the upper lug which is adapted to rest on said end of the temple hinge plate extending into the enlarged recess, and with said lower lug being freely separable from said upper lug by withdrawal of said pin-like securing means to permit the insertion and removal of a lens from a respective rim without disconnection of said rim from the supporting structure.

EDWARD M. SPLAINE.

REFERENCES CITED

The following references are of record in the file of this patent:

UNITED STATES PATENTS

| Number | Name | Date |
|---|---|---|
| 1,439,741 | McDonell | Dec. 26, 1922 |
| 1,565,890 | Baker | Dec. 15, 1925 |
| 2,284,630 | Banks | June 2, 1942 |
| 2,329,100 | Chappell | Sept. 7, 1943 |
| 2,331,666 | Dunkelsberg | Oct. 12, 1943 |
| 2,355,053 | Carlson | Aug. 8, 1944 |
| 2,389,742 | Rey | Nov. 27, 1945 |
| 2,392,990 | Lopez | Jan. 15, 1946 |
| 2,444,498 | Cochran | July 6, 1948 |
| 2,450,711 | Bouchard | Oct. 5, 1948 |

FOREIGN PATENTS

| Number | Country | Date |
|---|---|---|
| 463,000 | Great Britain | Mar. 19, 1937 |